United States Patent [19]
Josephs et al.

[11] Patent Number: 5,434,457
[45] Date of Patent: Jul. 18, 1995

[54] FOOT PEDAL SAFETY SWITCH AND SAFETY CIRCUIT

[76] Inventors: Harold Josephs, 25311 Ronald Ct., Oak Park, Mich. 48237; Ronald W. Szcesny, 27333 Spring Arbor Dr., Southfield, Mich. 48076

[21] Appl. No.: 100,552

[22] Filed: Jul. 30, 1993

[51] Int. Cl.⁶ ............................................. G05B 9/00
[52] U.S. Cl. .................. 307/326; 192/129 R; 192/129 A
[58] Field of Search ............. 192/129 A, 129 R, 130, 192/131 R, 131 H; 307/326; 361/189, 190

[56] References Cited

U.S. PATENT DOCUMENTS

| | | | |
|---|---|---|---|
| 4,811,193 | 3/1989 | Scott et al. | 363/165 |
| 5,025,175 | 6/1991 | Dubois, III | 307/326 |
| 5,168,173 | 12/1992 | Windsor | 307/139 |
| 5,235,217 | 8/1993 | Kirton | 307/326 |

*Primary Examiner*—A. D. Pellinen
*Assistant Examiner*—Jonathan S. Kaplan
*Attorney, Agent, or Firm*—Brooks & Kushman

[57] ABSTRACT

A foot pedal safety switch and safety circuit for industrial machines which effectively precludes accidental operation of a machine and improper repetitive cycling of a machine. The foot pedal is completely enclosed within a rigid enclosure having an entry door through which an operator's foot is inserted each time the foot pedal switch is actuated. The safety circuit includes one or more limit switches indicating the status of the access panel and triggering a timing circuit which provides a time period within which the foot pedal switch must be contacted to operate the machine. For a second operation of the machine, the operator's foot must be removed from the enclosure allowing the access panel to close. To repeat operation of the machine, the operator then places his foot again in the foot pedal through the access panel. The safety circuit is mounted within the foot pedal switch enclosure to provide a self-contained single-actuation device which can be easily incorporated into existing machinery.

11 Claims, 5 Drawing Sheets

FOOT PEDAL SAFETY SWITCH AND SAFETY CIRCUIT

TECHNICAL FIELD

The present invention relates to a safety foot pedal switch incorporating a safety circuit. More particularly, the present invention relates to a fully enclosed and fully self-contained foot pedal switch having a circuit which requires removal of an operator's foot from the foot pedal switch between actuations of the switch.

BACKGROUND ART

Industrial machines which are operated by an operator frequently require remotely located hand operated or foot operated switches for safe operation. Palm buttons are used in situations where a workpiece can be placed in a machine with the workpiece being supported by the machine. Palm buttons are preferred in such situations because both hands of an operator must be placed on and remain on the palm buttons to cause the machine to operate. This prevents the operator from being injured by foreseeably dangerous moving machine components.

However, some machines must be operated while the operator's hands remain on the workpiece. For example, power presses operating on large workpieces, press brakes, hydraulic bending machines, forging presses, power saws, slitting machines and many other types of machines often require the operator to support or manipulate the workpiece during the operating cycle the machine. These types of machines frequently utilize a remotely located foot pedal. Conventional foot pedals include a base to support a switch which may be partially covered by a shield.

Generally, OSHA regulations require comprehensive shielding of dangerous machine components such as pinch points in a power press, exposed edges of cutting tools, and rotating shafts of machines, especially when the machine is operated by a foot pedal. Production operators under pressure to manufacture production parts and skilled tradesmen operating machine tools to fabricate unusual parts may be tempted to remove mandatory safety guarding if and when provided by the manufacturer or employer, to make the workpiece more accessible. When the machine guards are removed, or applicable interlocks by-passed, machine operators are exposed to hazardous conditions.

For example, production power press operators can very easily be injured if their hands are caught in the power press. Such injuries will foreseeably result in crushing or amputation of an operator's fingers, hands, or arms or other body parts. Operators of power turning tools such as roll-benders or other rotating machines may be injured if their hands or clothing become caught in the machine. Many unfortunate yet foreseeable injuries resulting from these types of industrial machines present a major problem for manufacturing companies and their employees. Every effort should be made by machine designers, fabricators, manufacturers, distributors, and users to prevent the carnage of industrial workplace accidents which cause incalculable losses of life and limb and cause unnecessary personal suffering.

Foreseeable to the industry at large, including machine manufacturers and foot pedal manufacturers is that some production jobs require workers to perform repetitive tasks hundreds of times per hour to meet quotas. There is considerable pressure on such production operators to increase their speed to boost their output resulting in an incentive to remove guarding on machines and operate them in an unsafe repetitive mode. Repetitive operation of a machine equipped with a foot pedal results in what is commonly referred to as "riding the pedal." An operator may develop a rhythm which corresponds to the machine cycle time and rock back and forth on the pedal to maximize productivity. Industrial accidents may occur when an operator rides the pedal and moves his hands into the machine during its operating cycle.

Additionally machine operators, while performing their repetitive tasks, will foreseeably be subjected to job and human related stresses and diversions that will affect their ability to perform these repetitive tasks in a safe and consistent manner. Distractions could include a co-worker or supervisor calling the operator's name or a loud noise in the plant. Stresses include fatigue, pain, discomfort, problems at home, etc.

For example, an operator may improperly locate a workpiece in a machine and reach into the machine to reset it while his foot is still near the pedal. Any inadvertent foot motion would then operate the machine causing injury to the operator. This foreseeable industrial safety hazard could be prevented if the operator is required to remove his foot from the foot pedal entirely for each cycling of the machine.

Many foot pedal switches of the prior art do not completely enclose the switch utilized to operate the machine. Thus, it is foreseeable that the machine can be inadvertently triggered by foreign objects such as bars or beams or wires which contact the switch. In addition, an operator may inadvertently actuate the machine by stepping, nudging or brushing against the front or side of the foot pedal switch causing unexpected operation as has occurred in the industrial setting on far too many occasions. Even if the foot pedal switch provided is completely enclosed and the danger zone or point of operation of the machine is properly guarded, it is foreseeable that injuries can and do occur. This is due to failure of or intentional by-passing of the machine guarding coupled with inadvertent machine actuation by the operator riding the pedal of the fully enclosed foot pedal switch.

Prior art attempts to solve problems relating to foot pedal devices include the device proposed by DiBonaventura in U.S. Pat. No. 3,759,115. DiBonaventura discloses a foot pedal switch having a guard covering the tops and sides of the switch. The foot pedal switch includes a mechanical stop which retains and locks the foot pedal switch in an unactuated position. The foot pedal switch requires the operator to use a specific insertion method for proper operation. While this approach eliminates many of the hazards posed by inadvertent machine operation caused by foreign objects, it does not prevent an operator from riding the pedal to achieve repetitive machine operation. In fact, the arrangement of the mechanical lock, requiring a fairly complex manipulation of the operator's foot, would tend to encourage the operator to develop a technique for riding the pedal so that it is unnecessary to go through the complex manipulation of the foot.

Another approach is disclosed in U.S. Pat. No. 3,916,722 to Grobe which discloses a foot pedal switch having a latch plate which is yieldably constrained to a restricting position after a latch mechanism is set. Again, the operator must go through a complex initial motion to move the shield and latch mechanism out of a restricting position. Furthermore, Grobe fails to disclose a means for preventing repetitive machine operation by riding the pedal.

U.S. Pat. No. 3,805,085 to Andrews discloses a complex relay circuit for use with palm button switches wherein an operator must actuate a first switch by passing his hands through a light beam prior to contacting the palm button switches. The breaking of the light beam initiates a first time interval within which the operator must strike two palm button switches before the machine will operate. The circuit disclosed in Andrews is a relay circuit which can be simply defeated by providing appropriate jumpers, thereby circumventing the safety features of the device. While the Andrews device discloses a single cycle limitation for operation of a machine, the complexity of the device and requirement that two light beams and palm buttons be contacted within a time interval unnecessarily complicates the operator's job and tends to encourage the operator to find a way to defeat the safety device. Andrews' invention requires the use of hand operated dual palm buttons coupled with light beam sensors. Thus, it is not appropriate for those requiring foot pedal switches. Furthermore, Andrews is not a self-contained single-actuation system which can be easily plugged or wired into an existing machine switch receptacle.

U.S. Pat. No. 5,166,513 to Keenan et al discloses a dual actuation foot switch for medical laser systems wherein the foot switch is enclosed in a housing having an opening for receiving a foot. Two switches, which may be contacted in the housing initiate two different responses from the medical laser system. The Keenan device does not disclose a fail-safe foot pedal switch wherein an operator is precluded from riding the pedal, but instead seems to suggest this is the preferred mode of operation for medical laser systems.

These and other disadvantages and problems inherent in the prior art are solved by the applicant's invention which is summarized below.

SUMMARY OF THE INVENTION

In accordance with the present invention, it is an object to provide a foot pedal safety switch which is shielded on the top and all sides.

It is another object of the present invention to provide a foot pedal safety switch which prevents an operator from riding the pedal in an improper and unsafe manner.

It is still another object of the present invention to provide a foot pedal safety switch having an operator actuated reset feature.

Yet another object of the present invention is to provide a fail-safe system wherein if one switch or circuit fails, no machine operation will occur.

It is yet another object of the present invention to provide an adjustable, reliable and accurate time delay circuit which may be automatically reset by an operator by simply removing his foot from the foot pedal enclosure.

Another object of the present invention is to provide status indicator lights which show that the safety circuit is active and which is capable of distinguishing and counting both false and valid cycles.

It is a still further object of the present invention to provide an industrial design for a foot pedal switch utilizing a low voltage source capable of reliable operation in harsh industrial environments.

It is another object of the present invention to provide a self-contained foot pedal switch and processor unit which is portable and easily incorporated into existing machines utilizing foot pedal switches without modification of the machine.

It is yet another object of the present invention to provide a foot pedal safety switch and safety circuit which is not easily defeated by rewiring relays thus promoting operator compliance with required safety procedures.

The present invention relates to a system incorporating a foot pedal for preventing the inadvertent operation of a machine including a plurality of first transducers associated with a gate, a shielding enclosure restricting access to the foot pedal and a second transducer disposed within the shielding enclosure. The system includes processing means for processing first and second signals received from the first and second transducers, and means for generating a third signal for operating the machine. Machine operation is allowed if the second signal is received by the processing means within a time period initiated upon receipt of the first signal from the plurality of first transducers. The processing means prevents generation of the third signal upon subsequent receipt of the second signal from the second transducer and thereby prevents consecutive cycling of the machine until the processing means is reset when receipt of the first signal ceases.

According to another aspect of the invention, the foot pedal enclosure includes an access panel which is movable. The position of the access panel is monitored by the plurality of first transducers. The operator is able to actuate the second transducer only after the plurality of first transducers is actuated by the change in position of the access panel. According to the invention, the enclosure is a rigid housing having a single opening which is closeable by the access panel. The second transducer may also be referred to as a foot operated pedal switch while the plurality of first transducers is preferably a pair of limit switches which are substantially simultaneously actuated when the access panel is opened to allow access to the foot operated pedal switch.

Also, according to the present invention, the processing means determines an allowable interval between receipt of a signal from the second transducer after receipt of a signal from the plurality of first transducers to enable machine operation. The processing means also includes resetting means for preventing continuous energization of the plurality of first transducers from allowing continuous cycling of the machine when the second transducer is energized. The processing means also includes detection means for determining if the second transducer is energized within the allowable interval determined by the timing means. The timing means preferably comprises an electronic circuit for generating a pulse of selectable duration.

In the preferred embodiment of the present invention, the timing means is an electronic circuit including a monostable multivibrator which generates a single output pulse upon the first receipt of an input pulse. Means are also provided for receiving the input pulse from the first transducers by the monostable multivibrator and means for controllably setting the duration of the output pulse generated by the multi-vibrator.

The resetting means is preferably formed by a capacitor, a resistor connected to the capacitor, and means for causing an electric current to flow through the resistor to the capacitor. Switching means are coupled to the capacitor for allowing the capacitor to accumulate and store charge when the switching means is in a first state and dissipate charge when the switching means is in a second state.

According to another concept of the invention, the detection means comprises a logic gate for generating a signal indicating the receipt of an indication from the second transducer during the allowable interval determined by the timing means.

Preferably, the processing means comprises separate timing means, resetting means, and detection means for each transducer of the plurality of first transducers. Also preferably, the outputs of each of the detection means are serially connected resulting in a high degree of redundancy. Of course, it would be possible to serially connect the plurality of first transducers and utilize a single timing means, reset means, and detection means if a lesser degree of redundancy is desirable.

An additional aspect of the present invention is that the processing means, the plurality of first transducers and the second transducer are all housed within the shielding enclosure. A single output is provided to the normal foot pedal switch receptacle of the machine being operated.

In a preferred embodiment of the present invention, an electronic circuit for use in preventing inadvertent operation of a machine is provided. The circuit includes means for producing a first pulse upon receipt of a signal initiating a timing interval. The circuit also includes means for producing a second pulse of selectable duration wherein the duration of the first pulse is typically shorter than the duration of the second pulse. Means are also provided for generating a third pulse indicating the circuit has been properly actuated and allowing the machine to operate.

The circuit also includes a monostable multivibrator for generating the second pulse of selectable duration upon receipt of the first pulse. First switching means is coupled to the means for generating the third pulse and is also coupled to the monostable multivibrator via the means for producing the first pulse. The first switching means allows the electric potential to vary between two different fixed potentials corresponding to the state of the first switching means. The means for generating the third pulse is coupled to the monostable multivibrator and also coupled to the means for receiving the third pulse. The third pulse is generated while concurrently receiving both the second pulse and the signal initiating the second pulse. Thus, the duration of the third pulse will be the shorter of the duration of the second pulse and the duration of the signal initiating the second pulse. A third switching means is also provided by the circuit which is coupled to the means for generating the third pulse for energizing a relay coil.

According to a preferred embodiment of the invention, a monolithic integrated circuit such as a 555 timer is provided as the monostable multivibrator. The monolithic integrated circuit is coupled to a resistor and a capacitor network which determines the duration of the second pulse such that the duration of the second pulse is a constant factor multiplied by the time constant of the network.

According to an additional aspect of the invention, a method of preventing injury to an operator as a result of incidental operation of a machine which is actuated by a foot pedal switch is provided. The method includes the steps of receiving a plurality of first indications from a plurality of first transducers representative of a first action by the operator. Upon receipt of all of the first indications, a timer is enabled. When a plurality of second indications from the plurality of first transducers is received which is different from the first indications, a timing interval is initiated. The next step is to receive a third indication from the second transducer which is representative of a second action by the operator. Finally, the step of operating the machine is performed only during the first receipt of the third indication received from the second transducer within the timing interval.

According to the method provided by the present invention, the state of each of the transducers is constantly monitored. Combinations of these states represent a particular operating mode of the machine. The method further provides for counting the occurrences of the various combinations representing the operating modes and generating an output indicative of the number of occurrences of such combinations.

These and other aspects of the invention will become readily apparent to one of ordinary skill in the art from the following detailed description taken in conjunction with the drawings.

DETAILED DESCRIPTION OF PREFERRED EMBODIMENTS

Figure 1:
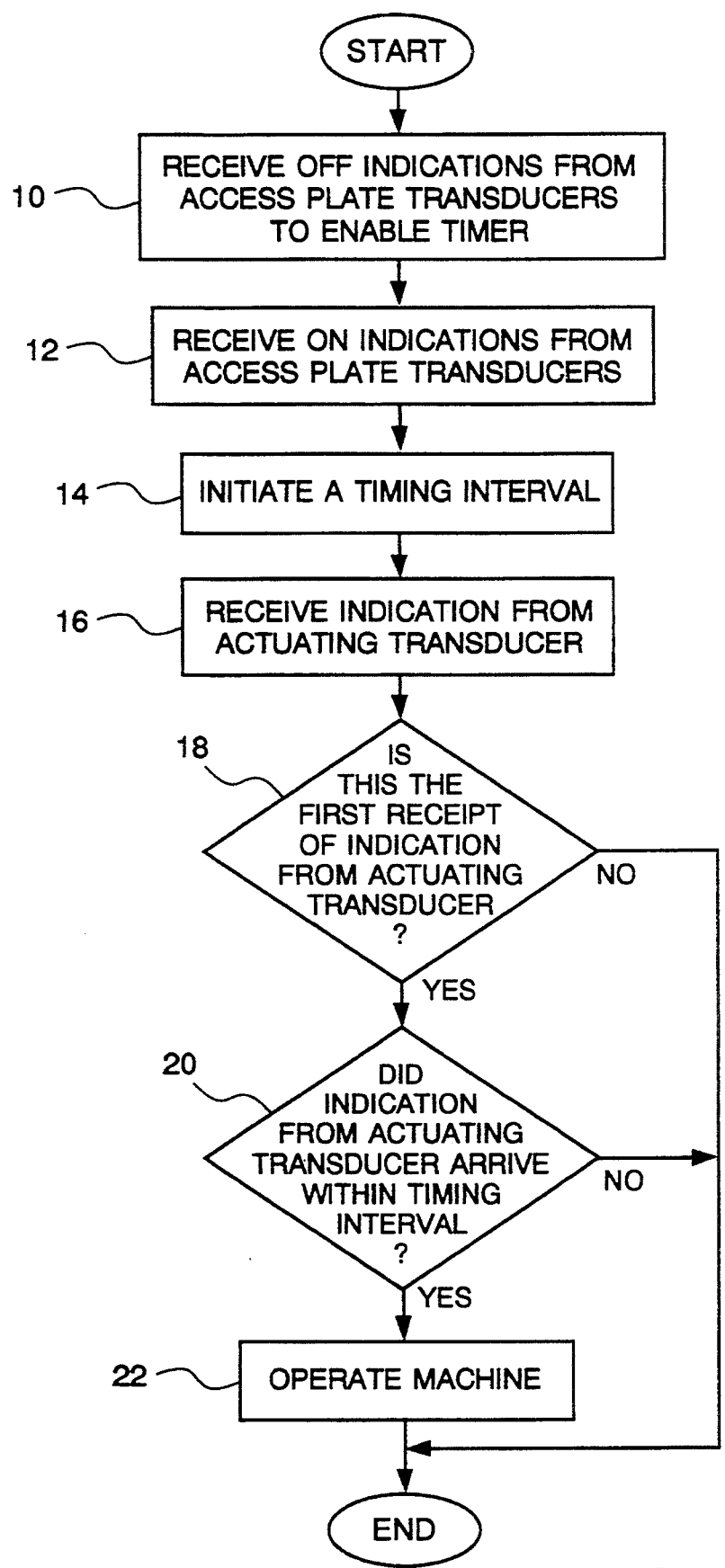
FIG. 1 is a flow chart illustrating the steps performed by the processor according to the present invention.

Referring now to FIG. 1, the general control strategy is illustrated by a flow chart wherein the first step in the process is indicated by reference numeral 10 and includes receiving a first indication from transducers associated with the access plate which enables the timer. The first indication signifies that the access panel is closed and the transducers are off. In reference numeral 12, a second indication is received from the access plate associated transducers. The indication received is an ON indication which initiates a timing interval as illustrated by the block identified by reference numeral 14. In block 16, the controller receives an indication from the actuating transducer which is also referred to as the foot pedal machine actuation switch in the preferred embodiment. Upon receipt of this indication from the actuating transducer, the control determines at reference numeral 18 whether this is the first receipt of indication from the actuating transducer. If it is not, then the attempt to operate the machine fails. If it is, the next step in the logic at reference numeral 20 determines whether the indication from the actuating transducer arrived within the timing interval. If not, the attempt to operate the machine is rejected. If the second indication arrives within the timing interval, the machine is given the appropriate signal to operate as indicated by reference numeral 22.

Figure 2:
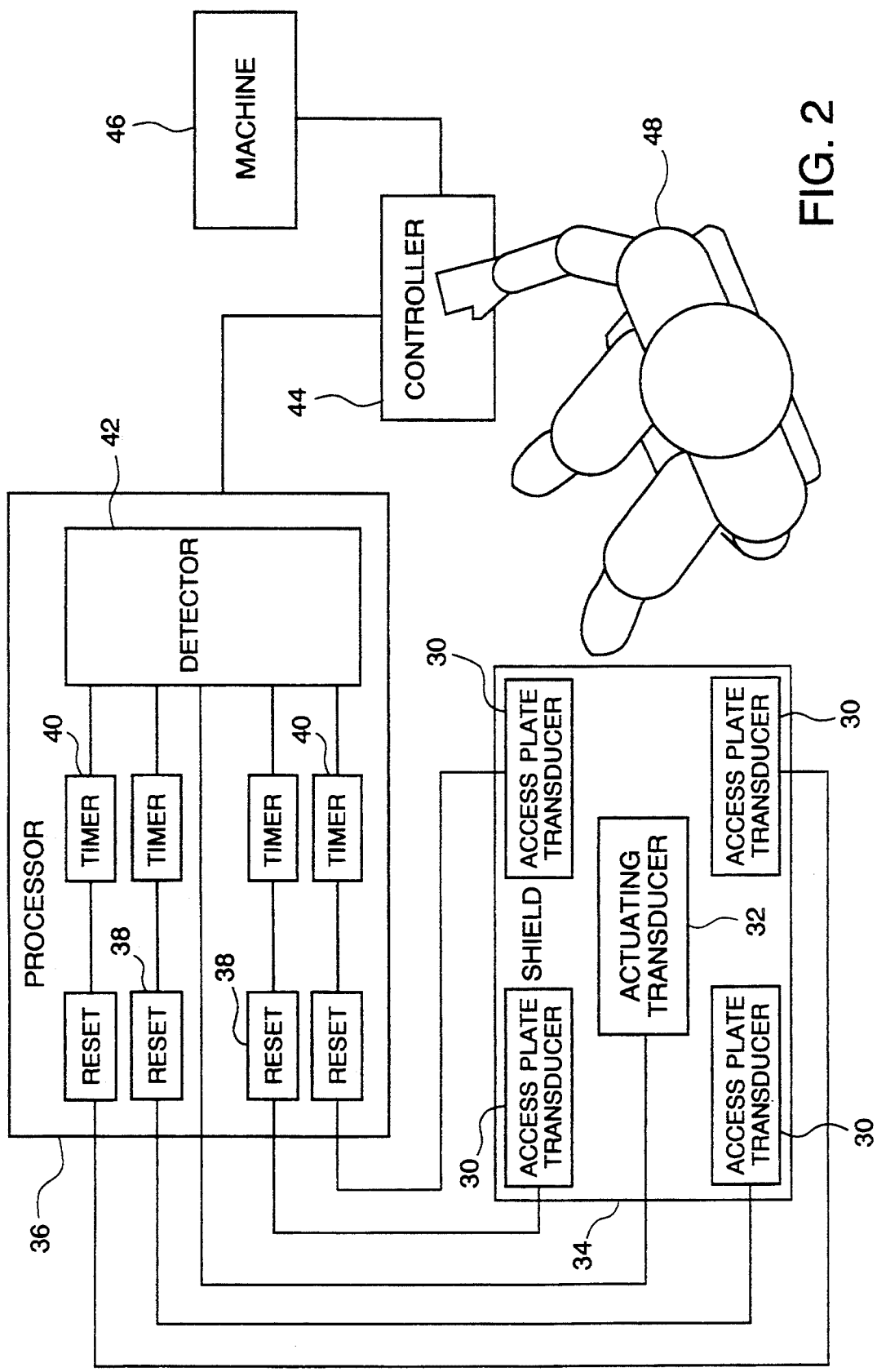
FIG. 2 is a block diagram of the system provided by the present invention.

Referring now to FIG. 2, the components of the system are shown in greater detail. Access plate transducers 30 and actuating transducer 32 are provided within the enclosure 34 which is adapted to receive an operator's foot as will be described below. Processor 36 includes a reset circuit 38 which is associated with each of the access plate transducers 30 and receives a signal therefrom. Each reset circuit 38 is operably connected to a timer circuit 40. The access plate transducers 30, reset circuits 38 and timer circuits 40 are parallel inputs to the detector circuit 42. In the preferred embodiment, the detector circuit 42 comprises a plurality of detecting means with each of the plurality associated with each of the timers 40 and the actuating transducer 32 and are serially connected to provide a single output signal to the controller 44 of the machine 46. The single output signal from the processor 36 is energized when each of the detecting means has received a signal from its corresponding timer 40 and the actuating transducer 32 is energized. The redundant transducer 30, reset 38 and timer 40 inputs and their associated detecting means incorporated in the detector circuit 42 are provided as redundant elements to minimize the possibility of injury to the operator 48 should any element fail. Furthermore, the redundancy makes this system more difficult for the operator 48 to defeat than systems disclosed in the prior art.

Figure 3:
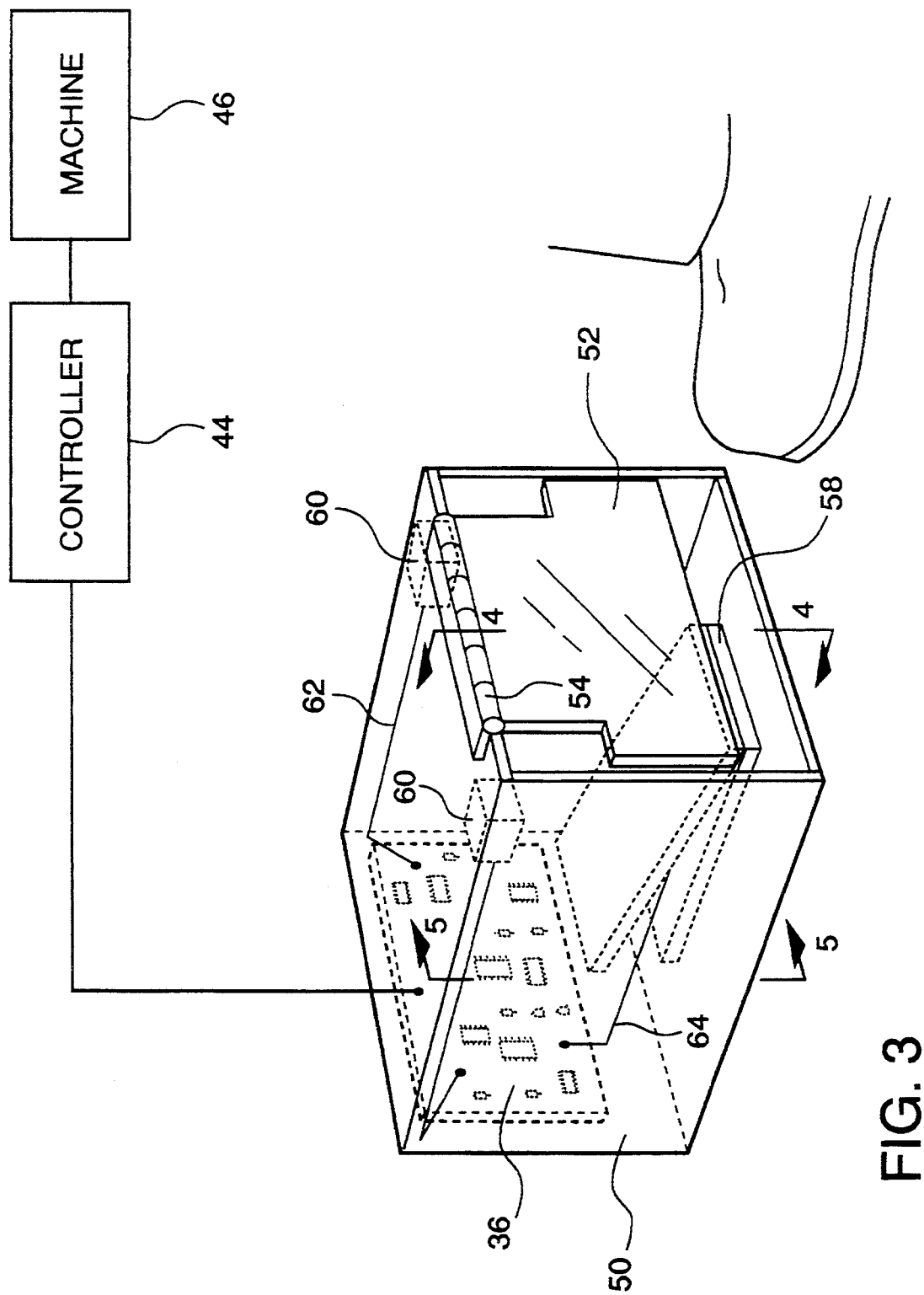
FIG. 3 is a schematic representation of a foot pedal incorporating the present invention.

Referring now to FIG. 3, the invention is shown to include an enclosure 50 shown schematically as an enclosed box-shaped member having a single open end. The open end is covered by an access panel 52 which is connected by a hinge 54 to substantially cover the open end of the enclosure 50. Within the enclosure 50, a foot pedal switch 58 is housed which corresponds to the actuating transducer 32 as shown in FIG. 2. Limit switches 60 are provided within the enclosure 50 and are positioned to be tripped by opening of the access panel 52. Signal wires 62 connect the limit switches 60 to the processor 36. Foot pedal switch 58 is connected by actuator wire 64 to the processor 36. Processor 36 is operatively connected to the controller 44 of machine 46 as previously described.

Figure 4:
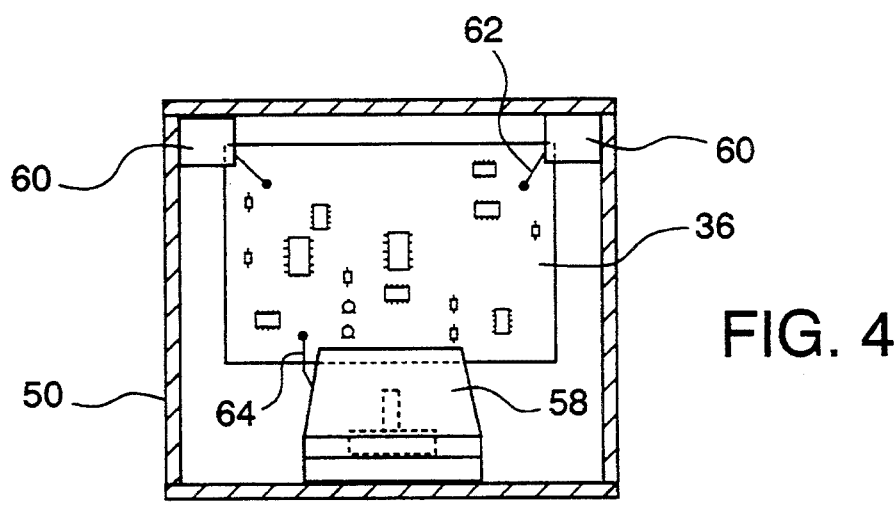
FIG. 4 is schematic front elevation view of a foot pedal made in accordance with the present invention.
Figure 5:
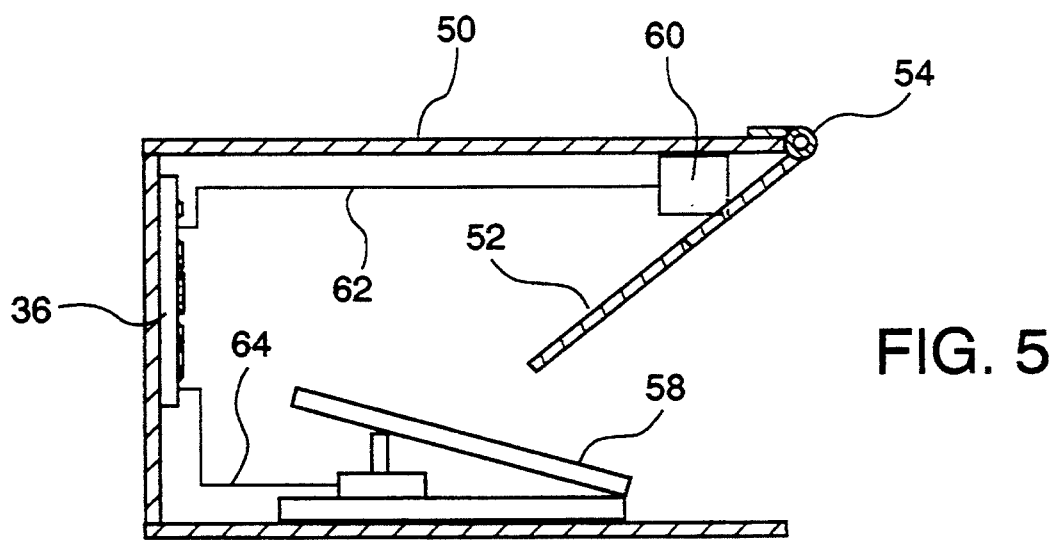
FIG. 5 is a schematic cross-sectional view of a foot pedal made in accordance with the present invention.

Referring now to FIGS. 4 and 5, the invention is illustrated with its component parts wherein the enclosure 50 houses the processor 36, foot pedal switch 58, limit switches 60 and their associated wires 62 and 64. With reference to FIG. 5, the access panel 52 is shown in its open position as would occur when an operator places his foot in the enclosure through the open end thereof causing the limit switches 60 to indicate the change in the position of the access panel 52.

Figure 6A:
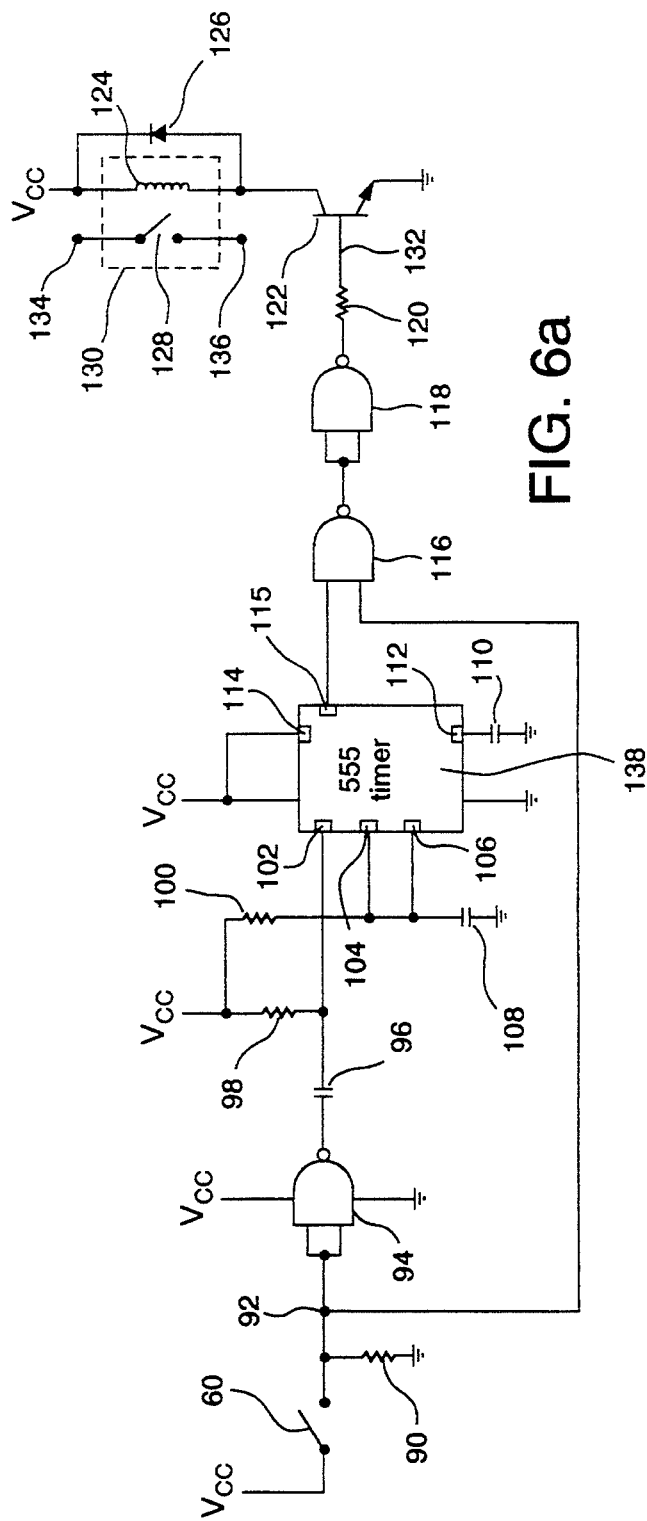
FIG. 6a is an electrical schematic showing a circuit for practicing the present invention.

Referring now to FIG. 6a, an exemplary circuit according to the teaching of the present invention will be described in detail. Limit switch 60 is connected to a 12 volt power supply. Grounding resistor 90 preferably a 10 KΩ resistor is provided between the limit switch 60 and input node 92 of the processor 36. Input node 92 is connected to input inverting NAND gate 94 which is also connected to a 12 volt power supply and ground. Coupling capacitor 96 preferably a 470 pF capacitor receives a signal from the NAND gate 94. Pull-up resistor 98, preferably a 10 KΩ resistor is connected between coupling capacitor 96 and a 12 volt power supply. Timing resistor 100, preferably a 470 KΩ resistor is connected to the 12 volt power supply. The trigger input pin 102 of the timer, preferably a 555 timer, is connected to the capacitor 96 and resistor 98. The timing resistor 100 is connected to the discharge pin 104 of the timer and the threshold pin 106 of the timer.

With continuing reference to FIG. 6a, a timing capacitor 108, preferably a 10 μF, is connected to the threshold pin 106 and ground. A control capacitor 110 is connected to a control voltage pin 112 of the timer and ground. Reset pin 114 of the timer is connected to a 12 volt power supply and the output pin 115 of the timer is provided to detector NAND gate 116. Detector NAND gate 116 is also connected to input node 92 and to power and ground, not shown for the sake of clarity. The output of detector NAND gate 116 is provided to output inverting NAND gate 118. A load coupling resistor 120, preferably a 4.7 KΩ resistor is connected between output inverting NAND gate 118 and the base of load transistor 122 which is preferably an NPN transistor. Relay coil 124 is connected between the 12 volt power supply and the load transistor 122. The emitter of load transistor 122 is connected to ground. First relay coil 124 is shunted by clamping diode 126. First relay contact 128 of first relay 130 is closed by the circuit when output node 132 is energized. Relay contact node 134 and relay contact node 136 are interconnected with a second relay contact described immediately below, completing a circuit for the machine operation when the relay contacts are closed. The timer shown at reference numeral 138 is preferably a 555 timer.

Figure 6B:
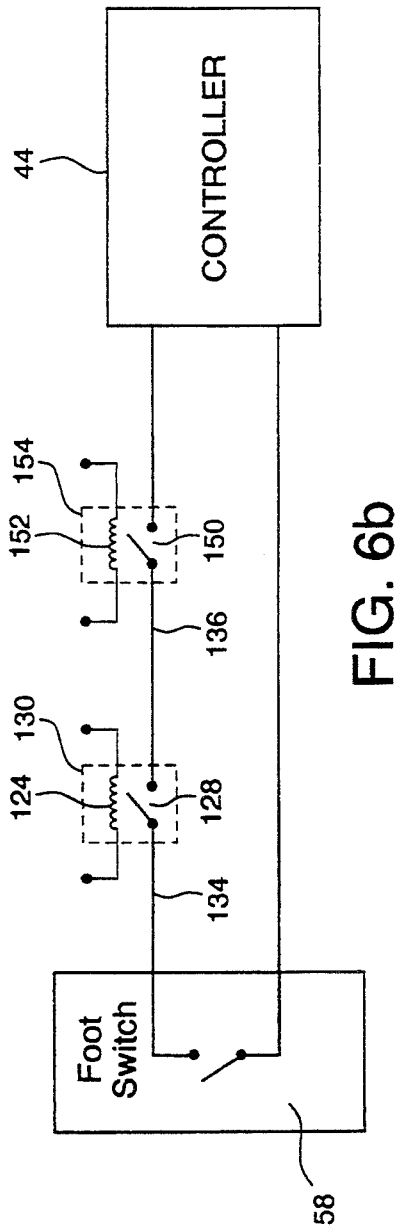
FIG. 6b is an electrical schematic showing interconnection of the foot switch and machine controller in a preferred embodiment of the present invention wherein first and second relays are each connected to a circuit as represented in FIG. 6a to provide a fully redundant system.

Referring now to FIG. 6b, a schematic is shown wherein the second relay contact 150 is provided by a circuit identical to the circuit shown in FIG. 6a which provides a second relay coil 152 of a second relay 154. According to the preferred embodiment as shown in FIG. 6b, two safety circuits are provided for redundancy which accrues the benefits already noted. Thus, both safety circuits must be satisfied to allow the foot switch 58 to communicate the signal to operate the machine to the controller 44.

In operation, according to the present invention, a foot switch 58 is located inside an enclosure 50 having an access panel 52 which must be open when a user inserts his foot into the enclosure 50. The enclosure 50 has two normally-open limit switches 60 which close when the access panel 52 is opened. The two limit switches 60 disable operation of the machine even if one switch fails thereby providing a redundant, fail-safe system.

Limit switches 60 are connected to a 12 volt power supply. While the access panel 52 is closed, limit switches 60 are open so that input node 92 is held at ground potential through grounding resistor 90 thereby energizing the output of input-inverting NAND gate 94. When the operator 48 inserts his foot into the enclosure 50, the access panel 52 opens, closing the limit switches 60 and allowing 12 volts to reach the input of NAND gate 94 and NAND gate 116. This causes the output of NAND gate 94 to go to ground instantaneously. The resulting voltage difference across the capacitor 96 causes a charging current to flow from the 12 volt power supply through the resistor 98, thereby charging the capacitor 96. The flow of charging current to the capacitor 96 makes the voltage at the input pin 102 of the TLC 555 timer 138 momentarily drop to nearly 0 volts with the period of time depending on the values chosen for the coupling capacitor 96 and the pull-up resistor 98. In the preferred embodiment, the momentary voltage drop is on the order of a few microseconds which then triggers the timer 138.

The timer triggers whenever the voltage at the input 102 goes below ⅓ of the value of the power supply voltage. With a TLC 555 timer, the threshold may be set at 4 volts for a 12 volt power supply. After the momentary voltage drop, the input 102 returns to its previous value since the capacitor 96 is charged and now blocks current. The output of the timer 138 at output pin 115 is a single pulse having a pulse width of 1.1*RC, wherein R is the value of timing resistor 100 in KΩ, C is the value of timing capacitor 108 in μF, and the pulse duration is in mS. While the pulse at output pin 115 is high, both inputs of NAND gate 116 are at 12 volts and the resulting output is 0 volts. NAND gate 118 inverts the output of NAND gate 116 making the output of NAND gate 118 12 volts. The output of NAND gate 118 is connected through load resistor 120 to the base of transistor 122. When 12 volts is applied to the base of the transistor 122, the transistor turns on, thereby energizing coil 124 of the first relay 130. Diode 126 is connected in parallel with the coil to reduce current spiking and its associated noise. Normally-open relay contact 128 closes when the coil 124 is energized, thereby providing a signal that the foot switch has been actuated within the time interval determined by timer 138, allowing operation of the machine 46. The foot switch 58 is only permitted to operate the machine while the timer 138 provides high output at pin 115. Therefore, the operator must depress the foot switch 58 during the specified time period to operate the machine 46.

The safety circuit requires that the operator 48 remove his foot from the enclosure 50 and reinsert it into the enclosure 50 before the machine 46 will operate again. If the operator's foot is not removed from the enclosure, the output of NAND gate 94 will remain at 0 volts and the capacitor 96 will remain charged making a drop in voltage at pin 102 of the timer 138 impossible. The timer 138 requires a drop in voltage at pin 102 before it will trigger and generate another pulse at the output pin 115. The drop in voltage will only occur if the capacitor 96 is first discharged which occurs when the voltage on both sides of the capacitor 96 is the same and the capacitor 96 is then recharged by generating a voltage difference across the capacitor 96. In other words, the drop in voltage, or "dip" occurs only during the transition between the discharge state and the charge state of the capacitor 96.

Discharging capacitor 96 occurs only if the output of NAND gate 94 is high which only happens if the limit switch 60 is opened which occurs when the access panel 52 closes. The pulse width at pin 115 of the timer 138 provides the operator 48 a time window within which the machine 46 can be operated. A connection between the foot switch 58 and machine 46 can only be established during the time that the pulse at the output pin 115 of the timer is high. If the operator 48 does not operate the machine within this time period, the coil 124 is deenergized and the switch 128 opens, breaking the connection between foot switch 58 and the machine 46. This way the operator 48 cannot ride the pedal by keeping his foot on the foot switch 58 or in the enclosure 50 to continuously operate the machine 46 because he must allow the limit switches 60 monitoring the access panel 52 to open when the access panel 52 is closed.

It will be readily appreciated by one of ordinary skill in the art that the structure of the foot switch and the circuit elements can be modified without departing from the spirit and scope of the invention. It will also be readily appreciated that photoelectric switches or proximity switches may be used instead of mechanical limit switches. The scope of the invention should be interpreted based upon the following claims.

What is claimed is:

1. A system for preventing unsafe operation of a machine having a foot pedal safety switch, the system comprising:

a plurality of first transducers generating a first signal indicating insertion of a foot into a foot pedal enclosure;

a second transducer generating a second signal indicating actuation of the second transducer by said foot;

processing means for processing the first and second signals and generating a third signal for operating the machine only if the second signal is received by the processing means within a time period initiated upon receipt of the first signal from the plurality of first transducers and for preventing generating the third signal upon subsequent receipt of the second signal from the second transducer so as to prevent consecutive cycling of the machine by repeated actuation of the second transducer until the processing means is reset by cessation of the receipt of the first signal; and said foot pedal enclosure shielding the plurality of first transducers, the second transducer, and the processing means.

2. The system of claim 1 wherein the foot pedal enclosure includes an access panel, the position of which is monitored by the plurality of first transducers, for allowing only said foot to actuate the second transducer.

3. The system of claim 1 wherein the foot pedal enclosure is a rigid housing having an access panel limiting access to the second transducer, the second transducer is a foot-operated pedal switch, and the plurality of first transducers comprises limit switches which are substantially simultaneously actuated when the access panel is in a position which allows access to the foot-operated pedal switch.

4. The system of claim 1 wherein the second transducer comprises a switch for indicating actuation of the second transducer.

5. The system of claim 1 wherein the processing means comprises:

timing means for defining an allowable interval between receipt of a signal from the second transducer after receipt of a signal from the plurality of first transducers;

resetting means for preventing continuous energization of the plurality of first transducers from allowing consecutive cycling of the machine by actuating the second transducer; and detection means for determining if the second transducer is energized within the allowable interval determined by the timing means.

6. The system of claim 5 wherein the timing means comprises an electronic circuit for generating a pulse of selectable duration upon receiving a trigger pulse.

7. The system of claim 6 wherein the electronic circuit comprises:

a monostable multivibrator which generates an output pulse having a controlled duration;

means for receiving an input pulse from one of the plurality of first transducers, the means for receiving being in communication with the monostable multivibrator; and means for controllably setting the duration of the output pulse generated by the multivibrator.

8. The system of claim 5 wherein the resetting means comprises:

a capacitor;

a resistor directly connected to the capacitor;

means for causing an electrical current to flow through the resistor to the capacitor;

switching means coupled to the capacitor for allowing the capacitor to accumulate and store charge when the switching means is in a first state, and dissipate charge when in a second state.

9. The system of claim 1 wherein the plurality of first transducers are connected in series with the processing means.

10. The system of claim 1 wherein each of the plurality of first transducers is connected to a corresponding plurality of processing means.

11. The system of claim 1 wherein the processing means comprises:

a monostable multivibrator circuit for determining an allowable interval between receipt of an indication from the second transducer after receipt of a signal from the plurality of first transducers;

a resistor and capacitor network for preventing continuous energization of the plurality of first transducers from allowing consecutive cycling of the machine by actuating the second transducer; and a logic gate for determining if the second transducer is energized within the allowable interval determined by the timing means.

* * * * *

UNITED STATES PATENT AND TRADEMARK OFFICE
CERTIFICATE OF CORRECTION

PATENT NO. : 5,434,457

DATED : July 18, 1995

INVENTOR(S) : Harold Josephs, et al.

It is certified that error appears in the above-indentified patent and that said Letters Patent is hereby corrected as shown below:

On the title page:   Under "Inventors:" please add --Kelvin Shih, 903 Devonshire, Brighton, Michigan 48116--.

Under "References Cited, U.S. Patent Documents" please add
--3,759,115  9/1973  Dibonaventura et al.
  3,785,222  1/1974  Dawson
  3,805,085  4/1974  Andrews
  3,866,004  2/1975  Nawrocki
  3,916,722  11/1975 Grobe
  4,280,164  7/1981  Kozek
  4,283,612  8/1981  Richards
  4,496,811  1/1985  Irwin
  4,839,533  6/1989  Aga
  5,166,513  12/1992 Keenan et al.--

Column 1, Line 31,   After "cycle" insert --of--.

Signed and Sealed this

Third Day of October, 1995

Attest:

BRUCE LEHMAN

Attesting Officer   *Commissioner of Patents and Trademarks*

UNITED STATES PATENT AND TRADEMARK OFFICE
CERTIFICATE OF CORRECTION

PATENT NO. : 5,434,457
DATED : July 18, 1995
INVENTOR(S) : HAROLD JOSEPHS, et al.

It is certified that error appears in the above-indentified patent and that said Letters Patent is hereby corrected as shown below:

On the title page: Under "Inventors:" please change "Szcesny" to --Szczesny--.

Signed and Sealed this

Thirtieth Day of April, 1996

Attest:

BRUCE LEHMAN

*Attesting Officer*   *Commissioner of Patents and Trademarks*